United States Patent
Knoop

(10) Patent No.: US 12,080,922 B2
(45) Date of Patent: Sep. 3, 2024

(54) FUEL CELL CLOSING SYSTEM

(71) Applicant: Robert Bosch GmbH, Stuttgart (DE)

(72) Inventor: Andreas Knoop, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/766,271

(22) PCT Filed: Sep. 18, 2020

(86) PCT No.: PCT/EP2020/076096
§ 371 (c)(1),
(2) Date: Apr. 4, 2022

(87) PCT Pub. No.: WO2021/063706
PCT Pub. Date: Apr. 8, 2021

(65) Prior Publication Data
US 2024/0055629 A1    Feb. 15, 2024

(30) Foreign Application Priority Data

Oct. 4, 2019   (DE) ..................... 10 2019 215 285.6

(51) Int. Cl.
*H01M 8/04082*   (2016.01)

(52) U.S. Cl.
CPC .... *H01M 8/04197* (2016.02); *H01M 2250/20* (2013.01)

(58) Field of Classification Search
CPC ......... H01M 8/04197; H01M 8/04179; H01M 8/04225; H01M 8/04097; F16K 31/0627; F16K 31/0682
See application file for complete search history.

(56) References Cited

U.S. PATENT DOCUMENTS

| | | | |
|---|---|---|---|
| 2004/0025949 A1* | 2/2004 | Wygnaski | F16K 31/082 137/66 |
| 2006/0134495 A1 | 6/2006 | Gallagher et al. | |
| 2009/0325031 A1* | 12/2009 | Sugawara | H01M 8/04253 429/425 |

(Continued)

FOREIGN PATENT DOCUMENTS

| | | |
|---|---|---|
| DE | 102007039466 A1 | 3/2008 |
| DE | 112004001274 T5 | 3/2008 |

(Continued)

OTHER PUBLICATIONS

Translation of International Search Report for Application No. PCT/EP2020/076096 dated Nov. 5, 2020 (3 pages).

*Primary Examiner* — Stewart A Fraser
(74) *Attorney, Agent, or Firm* — Michael Best & Friedrich LLP

(57) ABSTRACT

The invention relates to a fuel cell closing valve (36) having a valve closing body (5), which is electromagnetically movable from a first position to a second position by the energizing of an electrical coil (10) in order to close or open at least one medium passage of a fuel cell. In order to optimize the operation of the fuel cell system, the fuel cell closing valve (36) comprises two permanent magnets (13, 14), by means of which the valve closing body (5) can be held both in the first position and in the second position when the electrical coil (10) is in a currentless state.

8 Claims, 2 Drawing Sheets

(56) References Cited

U.S. PATENT DOCUMENTS

| | | | | |
|---|---|---|---|---|
| 2012/0161049 A1* | 6/2012 | Alvarez | ............. | F16K 31/0679 |
| | | | | 29/890.12 |
| 2014/0224891 A1* | 8/2014 | Matsusaka | ................ | F01P 7/14 |
| | | | | 236/34.5 |
| 2018/0034076 A1 | 2/2018 | Hasegawa et al. | | |
| 2019/0376611 A1* | 12/2019 | Ichiyama | ............ | F16K 31/0672 |

FOREIGN PATENT DOCUMENTS

| | | |
|---|---|---|
| DE | 102009039562 A1 | 3/2011 |
| DE | 102010053632 A1 | 6/2011 |
| DE | 102012210022 A1 | 12/2012 |
| DE | 102014204230 A1 | 9/2014 |
| DE | 102014018321 A1 | 6/2015 |
| DE | 102015011275 A1 | 3/2016 |
| DE | 102017213754 A1 | 2/2019 |
| EP | 1995813 A1 | 11/2008 |
| EP | 2126435 B1 | 12/2013 |

* cited by examiner

FUEL CELL CLOSING SYSTEM

BACKGROUND OF THE INVENTION

The invention relates to a fuel cell closing system having a valve closing body which, by electrical energization of an electrical coil, can be moved electromagnetically from a first position into a second position in order to close or open up at least one medium passage of a fuel cell. The invention furthermore relates to a method for actuating such a fuel cell closing valve. The invention furthermore relates to a fuel cell system having at least one such fuel cell closing valve. The invention furthermore relates to a method for operating such a fuel cell system.

The German published patent application DE 10 2007 039 466 A1 has disclosed a fuel cell control valve having a body which is defined by an inner surface and which runs through said body, and having a movable part for closing the passage. The German published patent application DE 10 2014 204 230 A1 has disclosed a fuel cell stack having a cathode valve which is operatively coupled to an outlet of the fuel cell stack in order to control a cathode flow to the fuel cell stack. The German published patent application DE 10 2015 011 275 A1 has disclosed a fuel cell system having a fuel cell stack that comprises an anode and a cathode, wherein a shut-off device is arranged in an exhaust-air section of the cathode. The European patent EP 2 126 435 B1 has disclosed a valve for a fuel cell system, having a housing which comprises an inlet channel, an outlet channel and a valve body, which valve body is arranged in the housing and has an intermediate liquid channel that provides a liquid connection between the inlet channel and the outlet channel. The German published patent application DE 10 2012 210 022 A1 has disclosed a valve for a fuel cell system, which valve comprises a main body with a passage, through which a flow of a fluid is permitted, and a displaceable element, which is arranged in the main body. The German published patent application DE 10 2010 053 632 A1 has disclosed a method for generating an oxygen-depleted gas in a fuel cell system, wherein a cathode exhaust-gas valve is closed, and a compressor is deactivated.

SUMMARY OF THE INVENTION

It is an object of the invention to optimize the operation of a fuel cell system.

The object is achieved, in the case of a fuel cell closing system having a valve closing body which, by electrical energization of an electrical coil, can be moved electromagnetically from a first position into a second position in order to close or open up at least one medium passage of a fuel cell, in that the fuel cell closing valve comprises two permanent magnets by means of which, in an electrically deenergized state of the electrical coil, the valve closing body can be held both in the first position and in the second position. The fuel cell closing valve advantageously serves to close a cathode side of the fuel cell as required during the operation of a fuel cell system that is equipped with the fuel cell closing valve. This is for example intended to prevent a diffusion of oxygen from the surroundings via a membrane from a cathode of the fuel cell to an anode. Depending on whether, and if so how many, such fuel cell closing valves are used, the above-described diffusion process may have a duration of hours or days. As soon as air is situated at the anode of the fuel cell, a restart of the fuel cell is referred to as an air/air start. Very high electrical potential differences arise in the fuel cell in this situation. These lead to very intense aging of catalysts of the fuel cell. By means of the claimed fuel cell closing system, the number of air/air starts over the service life of the fuel cell can be kept as low as possible. For this purpose, it is advantageous if one fuel cell closing valve is arranged at a cathode inlet and a further fuel cell closing valve is arranged at a cathode outlet of the fuel cell. The fuel cell closing valves particularly advantageously allow a desired air/air start in rare situations, in which the high potential differences are utilized to reverse possible poisoning of the catalysts situated in the fuel cell. The claimed fuel cell closing valve is of simple construction and can be produced inexpensively. With the two permanent magnets, the fuel cell closing valve can advantageously be held in an open position and in a closed position when in an electrically deenergized state.

One preferred exemplary embodiment of the fuel cell closing valve is distinguished by the fact that the valve closing body is combined with a guide rod to which the permanent magnets are attached. The guide rod advantageously serves to guide the valve closing body back and forth between the two positions that the valve closing body can assume during the operation of the fuel cell closing valve. A corresponding guide passage for the guide rod can be provided in a simple manner in a housing body of a valve housing of the fuel cell closing valve.

A further preferred exemplary embodiment of the fuel cell closing valve is distinguished by the fact that the valve closing body is in the form of a valve disk. By means of the valve disk, a relatively large medium passage of the fuel cell can be closed or opened up in a simple manner. The valve disk is particularly advantageously attached to one end of the guide rod. Depending on the embodiment, it may be advantageous for the valve disk to be connected integrally to the guide rod.

A further preferred exemplary embodiment of the fuel cell closing valve is distinguished by the fact that the valve disk is assigned a first seal, against which the valve disk sealingly bears in the first position, and a second seal, against which the valve disk sealingly bears in the second position. The seals are for example in the form of inexpensive O-ring seals.

In a method for actuating an above-described fuel cell closing valve, the above-stated object is alternatively or additionally achieved in that a polarity of the voltage supply of the electrical coil is reversed in order to switch the fuel cell closing valve between the first and the second position. The claimed fuel cell closing valve can thus be switched as desired by electrical energization of the electrical coil, wherein it is at the same time ensured that, when the electrical coil is in the electrically deenergized state, the valve closing body is held in its present position by the permanent magnets.

In the case of a fuel cell system having at least one above-described fuel cell closing valve, the above-stated object is alternatively or additionally achieved in that the fuel cell closing valve is arranged as a cathode valve in a cathode path. The cathode valve is configured for example as a 3/2 directional valve.

One preferred exemplary embodiment of the fuel cell system is distinguished by the fact that the fuel cell system comprises two cathode paths in which in each case one fuel cell closing valve configured as a 3/2 directional valve, as described above, is arranged. With the two 3/2 directional valves, flow can be caused to pass through the cathode side of the fuel cell in opposite directions in a straightforward manner.

A further preferred exemplary embodiment of the fuel cell system is distinguished by the fact that the fuel cell system comprises an additional fuel cell closing valve configured as a 2/2 directional valve, as described above. With the additional 2/2 directional valve, it is particularly advantageously possible, during operation of the fuel cell, to realize an additional function of isolation of the fuel cell cathode from the ambient air in a standstill situation.

In a method for operating an above-described fuel cell system, the above-stated object is alternatively or additionally achieved in that the throughflow direction on a cathode side of the fuel cell is reversed. The switching of the throughflow direction on the cathode side advantageously serves for fuel cell humidification. By means of the claimed arrangement of the two fuel cell closing valves, which are advantageously configured as 3/2 directional valves, external humidification can be omitted.

The invention furthermore relates to a permanent magnet, a valve closing body, in particular a valve disk, a guide rod and/or an electrical coil for an above-described fuel cell closing valve. Said parts may optionally be marketed separately.

Further advantages, features and details of the invention will emerge from the following description, in which various exemplary embodiments will be described in detail with reference to the drawing.

DETAILED DESCRIPTION

Figure 3:
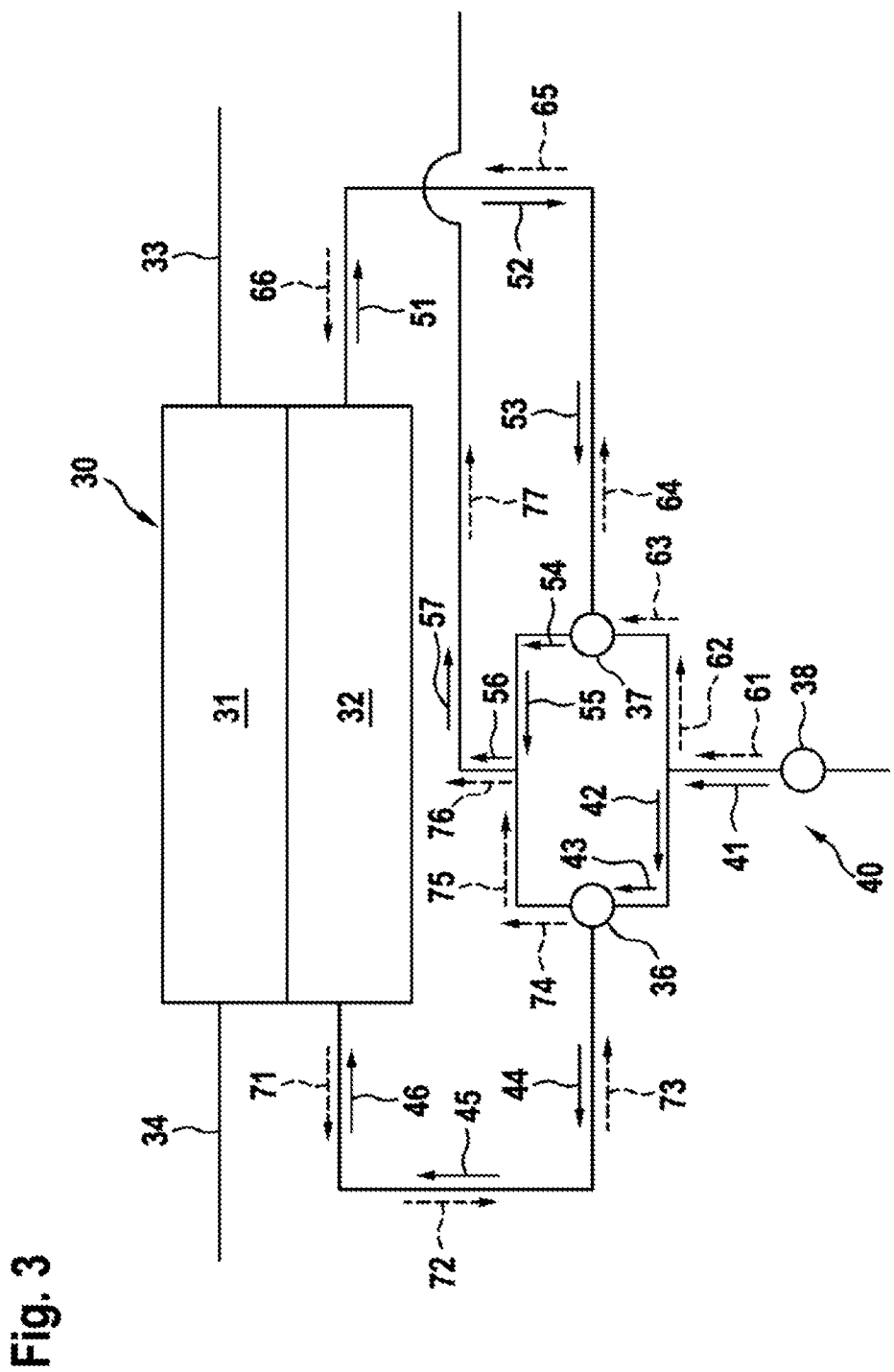
FIG. 3 is a schematic illustration of a fuel cell system with two fuel cell closing valves as illustrated in FIGS. 1 and 2.

FIG. 3 schematically illustrates a fuel cell system with a fuel cell 30. The fuel cell 30 comprises an anode side 31 and a cathode side 32. On the anode side 31, the fuel cell 30 has an anode inlet 33 and an anode outlet 34. On the anode side 31, the fuel cell 30 is supplied, for example, with hydrogen. On the cathode side 32, the fuel cell 30 is supplied, for example, with oxygen, in particular in the form of air, via a cathode inlet 40.

As can be seen below the fuel cell 30 in FIG. 3, a total of three fuel cell closing valves 36, 37, 38 are arranged on the cathode side 32, which fuel cell closing valves are each symbolically indicated by a circle. The fuel cell closing valves 36 and 37 are configured as 3/2 directional valves. The fuel cell closing valve 38 is configured as a 2/2 directional valve.

Arrows 41 to 46 and 51 to 57 in FIG. 3 are used to indicate a first cathode path that can be realized using the fuel cell closing valves 36 and 37. Via the first cathode path 41 to 46; 51 to 57, the cathode gas can be caused to flow through the cathode side 32 of the fuel cell 30 from left to right in FIG. 3.

Dashed arrows 61 to 66 and 71 to 77 are used in FIG. 3 to indicate a second cathode path that can be implemented by corresponding switching of the fuel cell closing valves 36 and 37. Via the second cathode path 61 to 66; 71 to 77, flow can be caused to pass through the cathode side 32 of the fuel cell 30 from right to left in FIG. 3.

Figure 1:
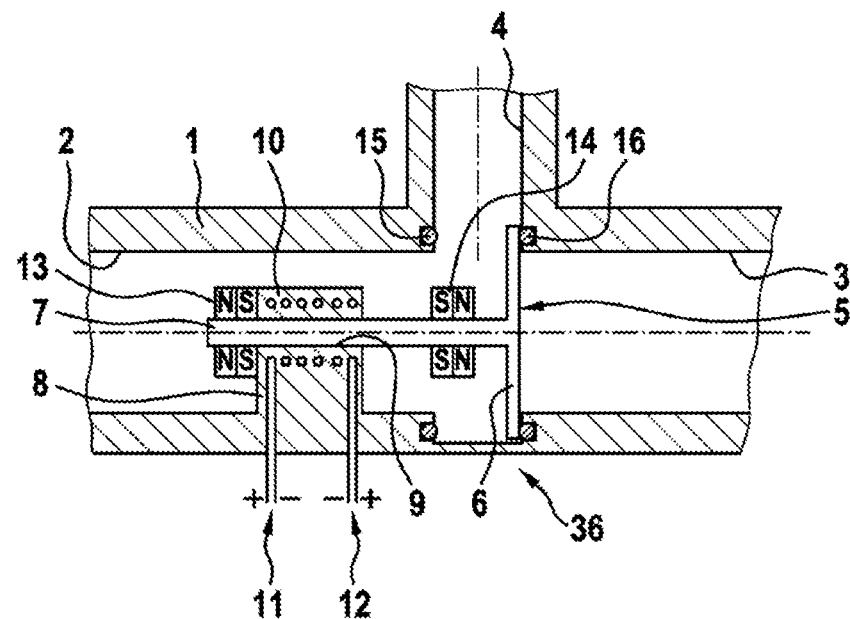
FIG. 1 shows a fuel cell closing valve with a valve closing body in a first position in a longitudinal section.
Figure 2:
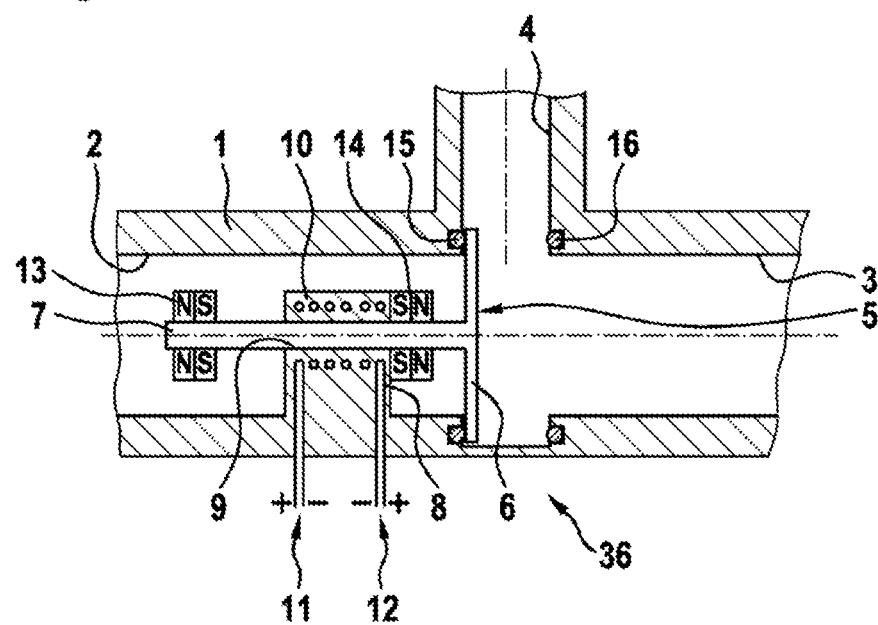
FIG. 2 shows the same sectional illustration as in FIG. 1, with the valve closing body in a second position.

FIGS. 1 and 2 illustrate the fuel cell closing valve 36 from FIG. 3 in detail and in longitudinal section, with a valve closing body 5 in a first position (FIG. 1) and in a second position (FIG. 2).

The fuel cell closing valve 36 comprises a valve housing 1 with three medium channels 2 to 4, which converge in the valve housing 1. The valve closing body 5 is in the form of a valve disk 6.

In FIG. 1, the valve closing body 5 is closing the medium channel 3, such that a cathode gas passes from the medium channel 2 into the medium channel 4, as indicated by the arrows 43 and 44 in FIG. 3. In FIG. 2, the valve closing body 5 is closing the medium channel 2, such that cathode gas can flow from the medium channel 4 into the medium channel 3, as indicated in FIG. 3 by the dashed arrows 73 and 74.

The valve disk 6 is attached to one end of a guide rod 7. With the guide rod 7, the valve closing body 5 is guided in a guide passage 9 of a housing body 8. The housing body 8 is connected integrally to the valve housing 1. An electrical coil 10 is arranged in the housing body 8. In the housing body 8, the electrical coil 10 surrounds the guide rod 7.

Symbols 11 and 12 in FIGS. 1 and 2 are used to indicate that a polarity of a voltage supply of the electrical coil 10 can be reversed as required.

Two permanent magnets 13 and 14 are fastened to the guide rod 7 at defined positions. Symbols in FIG. 1 are used to indicate that the permanent magnets 13 and 14 each have a north pole and a south pole.

Furthermore, two seals 15, 16 are arranged in the valve housing 1. The seals 15, 16 are for example in the form of O-rings and received in suitable annular grooves of the valve housing 1. In FIG. 1, the valve disk 6 is in sealing contact with the seal 16. In FIG. 2, the valve disk 6 is in sealing contact with the seal 15.

The fuel cell closing valve 36 in FIGS. 1 and 2 is moved by means of the two permanent magnets 13, 14 and the electrical coil 10. The polarity of the voltage supply to the electrical coil 10, which comprises a ferromagnetic core, can be selectively reversed. In this way, an attracting or repelling magnetic field is generated which acts on both permanent magnets 13, 14.

The end positions illustrated by way of the valve disk 6 in FIGS. 1 and 2 can thus be assumed by reversal of the polarity of the electrical coil 10, with guidance provided by the guide rod 7 in the guide passage 9 of the housing body 8.

For the function of preventing an air/air start, two fuel cell closing valves configured as 2/2 directional valves are sufficient. With two 3/2 directional valves 36, 37 as illustrated in FIGS. 1 to 3, it is advantageously possible for the throughflow direction on the cathode side 32 of the fuel cell 30 to be reversed or switched over, as indicated by the arrows 41 to 46, 51 to 57 and 61 to 66, 71 to 77 in FIG. 3.

The switching of the throughflow direction on the cathode side 32 serves for example for implementing fuel cell humidification. In this way, it is possible for external humidification, for example using a gas-to-gas humidifier, to be omitted. The switching of the throughflow direction on the cathode side 32 for the purposes of fuel cell humidification is expedient in particular in the case of fuel cell vehicles that have a sufficiently high degree of hybridization, because, during the switching of the cathode flow direction, the fuel cell can output no power or only reduced power. This means that, for a short time, for example a few seconds, the drive power must originate entirely or at least partially from a traction battery.

The fuel cell closing valve 38 in FIG. 3, which is preferably configured as a 2/2 directional valve, advantageously serves to separate the cathode side 32 of the fuel cell 30 from the ambient air in a standstill situation. For this purpose, the fuel cell closing valve 38 is arranged at the cathode inlet 40. The arrangement of the fuel cell closing valve 38 at the cathode inlet 40 is preferred because no product water is encountered in this region of the fuel cell system, and thus the risk of blockage as a result of freezing is minimal.

The invention claimed is:

1. A fuel cell closing valve (36; 37; 38) having a valve closing body (5) which, by electrical energization of an electrical coil (10), can be moved electromagnetically from a first position into a second position in order to close or open at least one medium passage of a fuel cell (30), wherein the fuel cell closing valve (36; 37; 38) comprises two permanent magnets (13, 14) configured to, in an electrically deenergized state of the electrical coil (10), hold the valve closing body (5) in the first position or in the second position, and wherein the valve closing body (5) is combined with a guide rod (7) to which the permanent magnets (13,14) are attached.

2. The fuel cell closing valve as claimed in claim 1, wherein the valve closing body (5) includes a valve disk (6).

3. The fuel cell closing valve as claimed in claim 2, further comprising a first seal (16), against which the valve disk (6) sealingly bears in the first position, and a second seal (15), against which the valve disk (6) sealingly bears in the second position.

4. A method for actuating a fuel cell closing valve (36) as claimed in claim 1, wherein a polarity of a voltage supply of the electrical coil (10) is reversed in order to switch the fuel cell closing valve (36) between the first and the second position.

5. A fuel cell system having at least one fuel cell closing valve (36; 37; 38) as claimed in claim 1, wherein the fuel cell closing valve (36; 37; 38) is arranged as a cathode valve in a cathode path (41-46, 51-57; 61-66, 71-77).

6. A fuel cell system having at least two fuel cell closing valves (36, 37), each of the at least two fuel cell closing valves having a valve closing body (5) which, by electrical energization of an electrical coil (10), can be moved electromagnetically from a first position into a second position in order to close or open at least one medium passage of a fuel cell (30), wherein the at least two fuel cell closing valves (36, 37) each comprise two permanent magnets (13, 14) configured to, in an electrically deenergized state of the electrical coil (10), hold the respective valve closing body (5) in the first position or in the second position, and wherein the fuel cell system (26) comprises two cathode paths (41-46, 51-57; 61-66, 71-77) each having therein a respective one of the at least two fuel cell closing valves (36, 37), each configured as a 3/2 directional cathode valve.

7. The fuel cell system as claimed in claim 6, wherein the fuel cell system comprises an additional fuel cell closing valve (38) configured as a 2/2 directional valve.

8. A method for operating a fuel cell system as claimed in claim 6, a throughflow direction on a cathode side (32) of a fuel cell (30) is reversed.

* * * * *